(12) United States Patent
Nielsen et al.

(10) Patent No.: US 12,111,800 B2
(45) Date of Patent: Oct. 8, 2024

(54) DATA CENTER MODELING FOR FACILITY OPERATIONS

(71) Applicant: SCHNEIDER ELECTRIC IT CORPORATION, Foxboro, MA (US)

(72) Inventors: Torben Nielsen, Odense (DK); Mikkel Dalgas, Winchester, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 18/197,128

(22) Filed: May 15, 2023

(65) Prior Publication Data
US 2023/0342343 A1    Oct. 26, 2023

Related U.S. Application Data

(63) Continuation of application No. 17/076,035, filed on Oct. 21, 2020, now Pat. No. 11,687,502, which is a
(Continued)

(51) Int. Cl.
*G06F 16/21* (2019.01)
*G06F 16/11* (2019.01)
(Continued)

(52) U.S. Cl.
CPC .......... *G06F 16/212* (2019.01); *G06F 16/122* (2019.01); *G06Q 10/06* (2013.01);
(Continued)

(58) Field of Classification Search
CPC ............... G06F 16/1834; G06F 16/273; G06F 16/9535; G06F 16/23; G06F 16/212
(Continued)

(56) References Cited

U.S. PATENT DOCUMENTS 6,345,281 B1    2/2002 Kardos et al.
6,404,975 B1 *  6/2002 Bopardikar ............ H04N 5/262
                                                  386/268
(Continued)

OTHER PUBLICATIONS

Extended European Search Report from corresponding European Application No. 14896344.0 dated Oct. 13, 2017.
Notification of Transmittal of the International Search Report and the Written Opinion of the International Searching Authority from corresponding PCT/US2014/044820 dated Oct. 28, 2014.

*Primary Examiner* — Shahid A Alam
(74) *Attorney, Agent, or Firm* — Lando & Anastasi, LLP

(57) ABSTRACT

A computer-implemented system and method for generating and maintaining at least one data center procedure is provided. The system includes a communication network, a storage device configured to store a plurality of basic unit instructions, one or more of the basic unit instructions having at least one procedure identifier, at least one processor coupled to the storage device and the communication network, and one or more components executable by the at least one processor and collectively configured to receive at least one data value associated with a data center, select at least one procedure identifier based on the at least one data value, identify a plurality of basic unit instructions associated with the at least one procedure identifier, assemble a data center procedure from the plurality of identified basic unit instructions, and provide the data center procedure to a user interface.

4 Claims, 4 Drawing Sheets

Related U.S. Application Data continuation of application No. 15/320,073, filed as application No. PCT/US2014/044820 on Jun. 30, 2014, now Pat. No. 10,817,485.

(51) Int. Cl.
*G06Q 10/06* (2023.01)
*G06Q 10/063* (2023.01)
*G06Q 10/10* (2023.01)
*G06Q 10/20* (2023.01)

(52) U.S. Cl.
CPC ........... *G06Q 10/063* (2013.01); *G06Q 10/10* (2013.01); *G06Q 10/20* (2013.01)

(58) Field of Classification Search
USPC ......................................................... 707/694
See application file for complete search history.

(56) References Cited

U.S. PATENT DOCUMENTS

| | | |
|---|---|---|
| 6,430,562 B1 | 8/2002 | Kardos et al. |
| 7,877,412 B2 | 1/2011 | Homer |
| 7,895,047 B2 | 2/2011 | Wetzer et al. |
| 8,433,547 B2 | 4/2013 | Dalgas et al. |
| 9,489,399 B1 * | 11/2016 | Laporte ................... G06F 16/20 |
| 10,437,902 B1 * | 10/2019 | Jain ..................... G06F 16/9535 |
| 2005/0108320 A1 | 5/2005 | Lord et al. |
| 2009/0177707 A1 | 7/2009 | Devraj et al. |
| 2010/0082309 A1 | 4/2010 | Dawson et al. |
| 2011/0099258 A1 | 4/2011 | Ayachitula et al. |
| 2012/0041569 A1 | 2/2012 | Zhang et al. |
| 2012/0117231 A1 | 5/2012 | Ingle et al. |
| 2013/0159039 A1 | 6/2013 | Brech et al. |

* cited by examiner

DATA CENTER MODELING FOR FACILITY OPERATIONS

CROSS-REFERENCE TO RELATED APPLICATIONS

This application is a continuation of U.S. patent application Ser. No. 17/076,035, titled DATA CENTER MODELING FOR FACILITY OPERATIONS, filed on Oct. 21, 2020, which is a continuation of U.S. patent application Ser. No. 15/320,073 [now U.S. Pat. No. 10,817,485], titled DATA CENTER MODELING FOR FACILITY OPERATIONS, filed on Jun. 30, 2014, and which is a U.S. National Stage Application under 35 U.S.C. § 371 of International Application No. PCT/US2014/044820 [expired], filed Jun. 30, 2014, titled DATA CENTER MODELING FOR FACILITY OPERATIONS. Each application referenced above is hereby incorporated by reference in its entirety for all purposes.

BACKGROUND

Technical Field

The technical field relates generally to facility operations, and more specifically, to procedural operations in a data center.

Background Discussion

Data centers house electronic devices, such as servers and computer storage devices. Since these devices generate a significant amount of heat during operation, data centers often include one or more types of cooling equipment. With a majority of tasks related to infrastructure maintenance requiring a human technician to perform them, human error is a leading cause of equipment failures in data centers.

SUMMARY

In an effort to reduce human error, data centers may maintain detailed descriptions of exactly how certain procedures should be performed. These detailed descriptions may be generally and collectively referred to as the Methods of Procedure, or MOPs. One or more MOPs may be directed to a specific piece of equipment or to a component of a piece of equipment. The MOPs are often in printed format that technicians physically transport into the data center to reference while he or she performs one or more procedures.

Aspects and embodiments disclosed herein manifest an appreciation that writing and maintaining a complete and updated library of MOPs can be a time-consuming process. Further, the MOP content may not be updated with new or more efficient procedural steps, and may also not reflect "live" conditions in the data center that can influence the successful completion of the procedure. For example, a replaceable component required for a scheduled preventative maintenance (PM) procedure may not be in stock or otherwise available, or a device configured to bypass power during part of a PM may be malfunctioning, thereby rendering the execution of the PM unfeasible. Accordingly, aspects and embodiments are directed to a data center infrastructure management (DCIM) system that is configured to maintain and automate the generation of flexible and dynamic MOPs. The MOPs may include one or more basic unit instructions that can be further assembled into a larger unit structure, including partial procedures and/or complete procedures. An MOP library may include component functional test procedures and equipment maintenance or troubleshooting procedures. MOPs may be generated and assembled to achieve a common goal.

According to various aspects and embodiments, a computer-implemented system for generating and maintaining at least one data center procedure is provided. The system includes a communication network, a storage device configured to store a plurality of basic unit instructions, one or more of the basic unit instructions having at least one procedure identifier, at least one processor coupled to the storage device and the communication network, and one or more components executable by the at least one processor. The one or more components executable by the at least one processor are collectively configured to: receive at least one data value associated with a data center, select at least one procedure identifier based on the at least one data value, identify a plurality of basic unit instructions associated with the at least one procedure identifier, assemble a data center procedure from the plurality of identified basic unit instructions, and provide the data center procedure to a user interface.

In the system, the at least one data value may include at least one real-time data value associated with equipment in the data center. According to one embodiment, the one or more components may be further configured to generate a real-time model of the data center based on the at least one real-time data value associated with the equipment and to assemble the data center procedure based on the real-time model of the data center. According to another embodiment, the one or more components may be further configured to modify at least one set of basic unit instructions stored in the storage device based on the at least one real-time data value associated with the equipment. According to yet another embodiment, the one or more components may be configured to receive the at least one real-time data value associated with the equipment from at least one of a sensor in communication with the equipment and a user in communication with the user interface, and the one or more components may be further configured to: identify a threshold value for the at least one real-time data value associated with the equipment, and determine a comparison result indicating whether the at least one real-time data value associated with the equipment transgresses the threshold value. According to a further embodiment, the one or more components may be further configured to: modify at least one set of basic unit instructions of the assembled data center procedure when the at least one real-time data value associated with the equipment transgresses the threshold value, assemble a modified data center procedure from the at least one modified set of basic unit instructions, and provide the modified data center procedure to the user interface.

According to another embodiment, the storage device may be further configured to store one or more conditions associated with a procedure identifier, and the one or more components may be further configured to: establish a rule for the one or more conditions associated with the procedure identifier, determine that the at least one selected procedure identifier satisfies the rule for each of the one or more conditions, and responsive to the determination that the rule for each of the one or more conditions is satisfied, include at least one set of basic unit instructions in the assembled data center procedure. According to a further embodiment, the one or more conditions may be selected from the group consisting of time based conditions, risk based conditions, dependency based conditions, real-time sensor value conditions, and historical based conditions. According to another embodiment, the one or more components may be further configured to: modify at least one set of basic unit instructions of the assembled data center procedure based on at least one of the at least one real-time data value associated with the equipment in the data center and the one or more conditions that satisfy the rule, assemble a modified data center procedure from the at least one modified set of basic unit instructions, and provide the modified data center procedure to the user interface.

In the system, the at least one set of basic unit instructions may be a partial procedure for equipment in the data center.

According to another embodiment, a method for generating and maintaining at least one data center procedure using a computer system including a storage device, at least one processor coupled to the storage device, and one or more components executable by the at least one processor is provided. The method includes acts of storing, by the computer system, a plurality of basic unit instructions, one or more of the basic unit instructions having at least one procedure identifier, receiving, by the computer system, at least one data value associated with a data center through a communication network, selecting, by the computer system, at least one procedure identifier based on the at least one data value, identifying, by the computer system, a plurality of basic unit instructions associated with at least one procedure identifier, assembling, by the computer system, a data center procedure from the plurality of identified basic unit instructions, and providing, by the computer system, the data center procedure to a user interface.

In the method, the at least one data value may include at least one real-time data value associated with equipment in the data center. According to one embodiment, the method may further include generating, by the computer system, a real-time model of the data center based on the at least one real-time data value associated with the equipment, wherein assembling the data center procedure includes assembling a data center procedure based on the real-time model of the data center. According to another embodiment, the method further includes modifying at least one set of basic unit instructions stored by the computer system based on the at least one real-time data value associated with the equipment. According to yet another embodiment, the at least one real-time data value associated with the equipment is provided by at least one of a sensor in communication with the equipment and a user in communication with the user interface, and the method may further include: establishing a threshold value for the at least one real-time data value associated with the equipment, and determining a comparison result indicating whether the at least one real-time data value associated with the equipment transgresses the threshold value. According to a further embodiment, the method may further include: modifying at least one set of basic unit instructions of the assembled data center procedure when the at least one real-time data value associated with the equipment transgresses the threshold value, assembling a modified data center procedure from the at least one modified set of basic unit instructions, and providing the modified data center procedure to the user interface.

According to another embodiment, the computer system further stores one or more conditions associated with a procedure identifier, and the method may further include: identifying, by the computer system, a rule for the one or more conditions associated with the procedure identifier, determining, by the computer system, that the at least one selected procedure identifier satisfies the rule for each of the one or more conditions, and responsive to determining that the rule for each of the one or more conditions is satisfied, including at least one set of basic unit instructions in the assembled data center procedure. According to a further embodiment, the one or more conditions may be selected from the group consisting of time based conditions, risk based conditions, dependency based conditions, real-time sensor value conditions, and historical based conditions. According to another embodiment, the method further includes: modifying at least one set of basic unit instructions of the assembled data center procedure based on at least one of the at least one real-time data value associated with the equipment in the data center and the one or more conditions that satisfy the rule, assembling a modified data center procedure from the at least one modified set of basic unit instructions, and providing the modified data center procedure to the user interface.

In the method, the at least one set of basic unit instructions may be a partial procedure for equipment in the data center.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
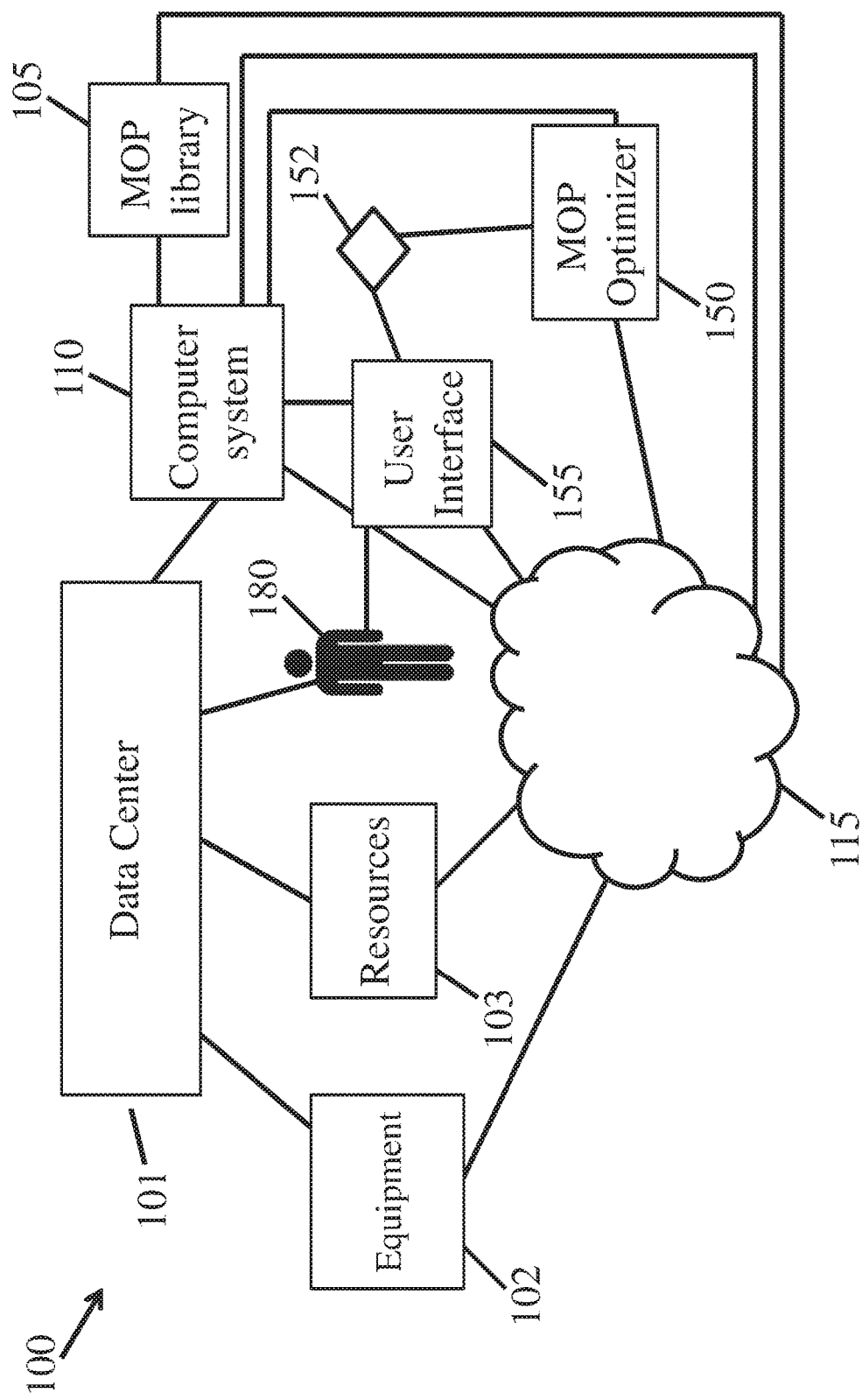
FIG. 1 is a navigational context diagram of a DCIM system according to one example.

Aspects of this disclosure are directed to a DCIM system that is configured to maintain and automate at least a portion of MOP generation, revision, and adaption processes. According to certain embodiments, the generation or creation of the MOPs is based on a "live" or real-time model of the data center. Some of these real-time values are dynamic values that characterize transient states of the data center or any of its elements. The real-time model-based DCIM is capable of maintaining up-to-date MOPs, creating new MOPS, and generating "ad-hoc" MOPs for addressing abnormal or aberrant events that may occur during the execution of an MOP. Technicians are provided with easy to follow, up-to-date, comprehensive, and interactive MOPs that allow the technicians to be more efficient and less error-prone.

The real-time model-based DCIM system functions as a technical information management device for building, generating, storing, and updating interactive MOPs. According to at least one embodiment, the DCIM system includes a computer system, an MOP library, an MOP optimizer, and a user interface. The DCIM system is configured to access equipment information contained in the MOP library and to combine this information with other system information to prepare an optimized MOP for display on the user interface. The DCIM system is therefore capable of combining information from a variety of sources and consolidating this information into a single optimized MOP. A data center technician can consult the optimized MOP and perform complete and accurate procedures from this single MOP.

Various aspects and functions described herein may be implemented as specialized hardware or software components executed in one or more computer systems. Examples of suitable computer systems may include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

In accordance with some embodiments, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to being executed on any particular system or group of systems. Further, aspects, functions, and processes may be implemented in software, hardware, firmware, or any combination thereof. Thus, aspects, functions, and processes may be implemented within methods, acts, systems, system elements, and components using a variety of hardware and software configurations, and the examples and embodiments are not limited to any particular distributed architecture, network, or communication protocol.

The aspects disclosed herein in accordance with the present invention are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

A representative DCIM system, generally indicated at 100, is illustrated in FIG. 1. According to this example, the DCIM system 100 includes at least one data center 101, equipment 102, resources 103, at least one computer system 110, a user 180, a user interface 155, an MOP optimizer 150, an MOP library 105, an optimized MOP 152, and a communication network 115. The data center 101 contains equipment 102. Examples of the equipment 102 include servers, racks, coolers, power supplies, power distribution units, backup power, uninterruptible power supply (UPS) equipment, routers, data connectivity and other related equipment. The data center 101 can be used to perform various functions, such as hosting web servers, hosting databases, providing back-end support for finance or e-commerce or other commercial enterprises, or any other function that can be performed by computer. The data center 101 may require resources 103 in the form of mechanical support for the equipment 102. For example, the resources 103 may include fire suppression equipment, utility power, cooling fluid lines, and any other infrastructure that may be used by the equipment 102. A user 180, such as a technician, may be tasked with performing one or more procedures on equipment 102 located in the data center 101. The user 180 may also interact with a user interface 155, discussed further below, that allows the user 180 to communicate with other components of the DCIM system 100.

As shown in FIG. 1, one or more of the components of the DCIM system 100 may be interconnected by, and may exchange data through a communication network 115. According to some embodiments, the communication network 115 may be any communication network through which data may be exchanged between the different components of the DCIM system 100. Suitable methods, protocols and standards may include, among others, Fibre Channel, Token Ring, Ethernet, Wireless Ethernet, Bluetooth, IP, IPV6, TCP/IP, UDP, DTN, HTTP, FTP, SMTCP/IP, UDP, SNMP, SMS, MMS, SS7, JSON, SOAP, CORBA, REST, and Web Services.

To ensure data transfer is secure, the data may be transmitted via communication network 115 using a variety of security measures include, for example, TLS, SSL, or VPN.

According to certain embodiments, the communication network may include any communication coupling between system components, such as one or more physical busses in conformance with specialized or standard computing bus technologies such as IDE, SCSI, PCI and InfiniBand. Communication network 115 enables communications, such as data and instructions, to be exchanged between components of the DCIM system 100.

MOP Library

MOPs are discrete operational procedures showing one or more objectives, such as maintenance and troubleshooting procedures, for data center equipment such as servers, networking devices, cooling and heating devices, and other related data center equipment. The MOPs may be provided to technicians in a textual manner in the form of documentation, which may be presented in electronic form. The text of each procedure is segmented to form a sequence of steps or acts, otherwise referred to herein as basic unit instructions. Each step or act includes an action to be performed on one or more components of the equipment that is referred to in the MOP. A component may include one or more subcomponents, an assembly, including an assembly of an item of equipment, a system, or any other constituent component of a piece of equipment. Further, the MOP may be directed at one or more pieces of equipment. According to some embodiments, the MOP may also be in a machine-readable format, so that it can be read or otherwise understood or processed by a computer system.

The textual content of the MOP may be electronically stored in an MOP library 105. The MOP library 105 may function as a database or other electronic storage device, and may be physically manifested as an electronic storage medium. The MOP library 105 may be stored as a database in a storage device. According to some embodiments, the MOP library 105 may be stored in the system memory, as discussed further below, of the computer system 110. In other embodiments, the MOP library 105 functions as a stand-alone database that is in communication with the computer system 110.

MOPs may be written by one or more technicians or other personnel, such as design or other engineer(s) who possess some level of technical knowledge about the equipment. The MOPs associated with the MOP library 105 may include a variety of technical equipment information for use by a technician or other user in diagnosing, repairing, or otherwise servicing one or more equipment components. For example, the MOP library may include component functional test procedures and equipment maintenance or troubleshooting procedures. Examples of MOPs may include a complete preventative maintenance (PM) procedure for a specific piece of equipment 102. In some examples, the MOP may include an installation procedure for an entire piece of equipment and/or any one of its components. Other MOPs may include troubleshooting information based on the current behavior of the equipment. In a related manner, MOPs may include repair information for the equipment or components of the equipment. In other examples, the MOP may include information that is equipment-generic, so that the information may be applied to different types of equipment. The MOP library 105 may also include a compilation of known equipment conditions based on experience, as well as the associated repair or maintenance guidelines that provide instructions for resolving a known equipment condition. As discussed further below, the MOP optimizer 150 is configured to use one or more elements of the information referenced above to provide an optimized MOP 152.

The MOP library may also include diagrams, graphics, and/or image data illustrating one or more components of the equipment. According to some embodiments, the MOPs may be created and/or updated by one or more users 180 through the use of the user interface 155. For example, a technician may update a current MOP to reflect a more efficient or alternative method for performing one or more of the steps or acts in a procedure.

The MOPs may include one or more basic unit instructions that are directed to an entire procedure, or in certain instances, to a partial procedure. According to at least one embodiment, an MOP may include a plurality of basic unit instructions. According to another embodiment, one or more basic unit instructions form a set of basic unit instructions. According to a further embodiment, the set of basic unit instructions is a partial procedure. In yet a further embodiment, the set of basic unit instructions is a complete procedure. In some embodiments, one or more partial procedures, which may include one or more sets of basic unit instructions, are assembled into a complete procedure. As discussed further below, in some instances, the MOP optimizer 150 may use one or more of the basic unit instructions or one or more sets of basic unit instructions to generate one complete optimized MOP 152. The MOPs stored in the MOP library 105 may include complete partial procedures that are constructed from a set of one or more basic unit instructions. A complete MOP may therefore be constructed from one or more of these sets. According to one example, the MOP may be directed to an annual PM procedure for a particular server. The MOP includes individual steps or acts from start to finish for the entire procedure. These individual steps or acts are represented by the basic unit instructions. A specific example of a partial procedure includes the steps taken to repair or replace a common component, such as a circuit board, which may be included in one or more types of equipment in the data center. Thus, each step of instruction represents a basic unit instruction and a partial procedure may include one or more basic unit instructions. According to another specific example, the partial procedure may include instructions as specific as loosening a specific screw at a specific location on a particular panel of a particular type of UPS. According to another example, the partial procedure may be directed to a common activity, such as a method for testing the rate of airflow.

The MOP library 105 may also store MOPs that are directed to different levels of users. For example, the MOP library 105 may include several MOPs directed to one device, but each MOP may include varying levels of detail. An entry-level user, who may not have as much mechanical experience, will use an MOP with more detail than a senior level technician who may only require a basic outline of the individual steps or acts. MOPs may also be directed to operators, who may not possess certain technical capabilities, but are capable of performing a series of simple steps. For example, through the use of an MOP, an operator may be able to perform some basic troubleshooting steps before calling in a technician. As discussed further below, the MOP optimizer 150 can take into account the level of user 180 and generate a custom or optimized MOP 152 based on this information. For instance, if a senior-level technician "clocks in," an MOP may be created that is targeted to their specific skill set, such as activities that require a certain level of certification in order for them to be successfully performed. Further, some MOPs may not be performed unless a certain level of technician is available to perform the MOP.

According to at least one embodiment, the MOP library 105 may be initially built or populated using MOPs written or otherwise provided by technicians and/or equipment manufacturers. These MOPs may provide the basic unit instructions that form the starting point from which future MOPs are generated. The basic unit instructions may collectively form a complete procedure, or may form one or more partial procedures. One or more of the basic unit instructions that form a complete procedure or partial procedure may be further edited by other technicians or users. For example, a partial procedure may be amended for content to reflect a more efficient method for performing a task. Further, a partial procedure may be edited to become an entire procedure, which may be especially useful during the time the MOP library is first being established. The MOPs are configured to be re-usable and capable of being amended or changed to reflect more or less detail. For example, a lower level technician may require more detail than a senior level technician. The MOPs may also be amended or otherwise changed to address different purposes or objectives. In certain instances, the content of the MOPs may be changed or amended by a computer. For example, the MOP optimizer 150, discussed further below, may be configured to create or amend a procedure based on real-time data collected from the data center, or based on other criteria, such as a software upgrade that may need to be implemented on several pieces of equipment.

The MOPs may be written as basic unit instructions that can be further assembled into a larger unit structure that forms either a partial or complete procedure. For example, a repair procedure may include an initial set of troubleshooting instructions, which may then be followed by a set of repair instructions once the malfunctioning component is identified. Thus, the complete MOP may include separate unit instructions that are directed to troubleshooting and repair. In certain instances, the MOP library 105 may group MOPs based on equipment and/or components of the equipment. According to certain embodiments, the grouping may function as a procedure identifier, as discussed further below. The MOPs may also be grouped by function, which in some instances may be related to a condition, as discussed further below. For example, MOPs that achieve a common goal, such as bypassing power to one or more pieces of equipment, may be grouped together. In other examples, MOPs may be grouped by a common condition, such as the loss of power or cooling to one or more locations in the data center 101. According to various examples, the MOPs may also be grouped by a combination of a condition and equipment. For example, one or more MOPs may be grouped by recurring events, such as preventative maintenance, for specific equipment. MOPs may also be grouped by expected events, such as the installation of new server equipment. The MOP library 105 may therefore be indexed so that any one or more of the MOPs may be retrieved based on equipment and/or condition, such as power loss.

Computer System

The DCIM system 100 includes at least one computer system 110 that is configured to provide a number of functions. For example, the computer system 110 may function to store real-time data related to equipment in the data center. Real-time data may include information regarding real-time conditions in the data center, such as the current state, including alarms, associated with specific pieces of equipment. Real-time data may also include temperature data associated with one or more locations in the data center. Therefore, the computer system 110 may be in communication with equipment in the data center through the communication network 115. As discussed further below, this information may be provided by sensors placed in the data center, including the equipment. The computer system 110 may also function to store historic data related to the equipment, such as maintenance records, usage data, and other performance-related information. For example, the computer system 110 may include software which polls each component in the data center to collect real-time information concerning the equipment and its components, for example, through the use of one or more sensors. This information may be useful in establishing trends or other statistical data regarding a single piece of equipment or a family of functionally related equipment.

Further, the computer system 110 may include or generate one or more spatial-temporal models for modeling the behavior of the equipment in the data center over space and time. For example, in some embodiments the computer system 110 generates a model of the data center using data related to each piece and type of equipment (such as power, cooling, network, etc.) and their relationship with one other, such as physical location, proximity, and redundancy information. The model may be a "live" or "real-time" model, meaning that the model reflects real-time conditions of the equipment in the data center. In certain instances, the real-time model may be generated using the real-time data as described above. The real-time model may also include historical data, as discussed above. For example, a piece of equipment may have a component that, based on historical maintenance records, is prone to failure after a certain number of hours of use. The real-time model may reflect that based on current usage, the component needs to be changed out. The real-time model may also incorporate a maintenance schedule or other system that monitors and/or controls usage, repairs, and any other activity related to the upkeep of the equipment in the data center. For example, if a piece of equipment is due for a monthly PM procedure, the real-time model can reflect this information. Further, the real-time model may also incorporate data related to one or more resources, as discussed further below. For instance, a PM procedure may be delayed or postponed if the resource data indicates that a required part is out of stock or if the back-up equipment is currently unavailable. In various embodiments, the real-time model includes equipment status, alarms, and historical data.

The computer system 110 may also be configured to perform a simulation of the data center. For example, one of the spatial-temporal models may be used to perform a simulation of equipment and/or conditions in a data center. The simulation may be used by the MOP optimizer 150, discussed further below, to assess or otherwise predict the impact that performing a particular MOP would have on the data center. The MOP optimizer 150 may then adapt or revise the optimized MOP 152 based on this feedback. For example, the instructions included in the optimized MOP 152 may include re-distributing workload from one server to another or simply target a different piece of equipment for performing the procedure. The cycle may iterate several times, for example, until a certain threshold is met. For example, the threshold may represent an acceptable error set by a user. In certain instances, the error may be set to represent an acceptable level of impact on the data center, such as reducing back-up power by a certain percentage or targeting a different server for maintenance to avoid loss of critical data load during daytime hours.

Further, the computer system 110 may be capable of performing impact analysis. For example, the impact analysis can include information regarding how the execution of an MOP on one piece of equipment will affect other neighboring or related equipment. In certain instances, the impact analysis may be based on the results of a simulation or modeling exercise. The impact analysis may include real-time data collected from the data center. For instance, a server that unexpectedly breaks down may impact one or more other servers in the data center by increasing their carrying or processing load. Impact analysis within the context of a data center is further discussed in U.S. Pat. No. 8,433,547, titled "SYSTEM AND METHOD FOR ANALYZING NONSTANDARD FACILITY OPERATIONS WITHIN A DATA CENTER," which is hereby incorporated by reference in its entirety. Further, as mentioned previously, a scheduled PM may be postponed if designated back-up equipment is unavailable or if the current processing load in the data center is too high to accommodate taking the targeted equipment offline.

According to a further embodiment, the computer system 110 may, based on the impact analysis, be capable of instructing or otherwise interacting with other components of the DCIM system 100. For example, workload may be re-distributed within the data center 101 to minimize the impact of an MOP on the functionality of the data center 101, such as by minimizing the interruption of power and/or other utilities, such as cooling or networking capability, to servers carrying vital data loads. According to another example, one or more settings or workloads may be increased or decreased on equipment to accommodate an MOP that is being performed. For instance, additional cooling units or fan speeds in neighboring cooling units can be increased during the time when one cooling unit is being serviced to ensure that other servers or other equipment do not overheat, or processing load(s) may be migrated to unaffected equipment.

The computer system 110 includes a processor that may be any type of processor, multiprocessor, or controller. Some example processors include commercially available processors such as an Intel Xeon, Itanium, Core, Celeron, or Pentium Processor, an AMD Opteron processor, or Apple A4 or A5 processors, a Sun UltraSPARC or IBM Power5+ processor and an IBM mainframe chip.

The computer system 110 also includes system memory that stores programs and data during operation. The system memory may be a relatively high performance, volatile, random access memory such as a dynamic random access memory ("DRAM") or static memory ("SRAM"). However, the system memory may include any device for storing data, such as a disk drive or other non-volatile storage device. Various examples may organize the system memory into particularized and, in some cases, unique structures to perform the aspects and functions disclosed herein. These data structures may be sized and organized to store values for particular data and types of data.

A data storage element may also be included with the computer system 110. The data storage element may include a computer readable and writeable nonvolatile, or non-transitory, data storage medium in which instructions are stored that define a program or other object that is executed by the processor. The data storage element may also include information that is recorded, on or in, the medium, and that is processed by the processor during execution of a program. More specifically, the information may be stored in one or more data structures specifically configured to conserve storage space or increase data exchange performance. The instructions may be persistently stored as encoded signals, and the instructions may cause the processor to perform any of the functions described herein. The medium may, for example, be optical disk, magnetic disk or flash memory, among others. In operation, the processor or some other controller causes data to be read from the nonvolatile recording medium into another memory, such as the system memory discussed above, that allows for faster access to the information by the processor than does the storage medium included in data storage element. The memory may be located in the data storage element or in the system memory. However, the processor manipulates the data within the memory, and then copies the data to the storage medium associated with the data storage element after processing is completed. A variety of components may manage data movement between the storage medium and other memory elements and examples are not limited to particular data management components. Further, examples are not limited to a particular memory system or data storage system.

The computer system 110 may also include an interface device, such as an input device, output device, and a combination input/output device. The interface device may receive input or provide output. More particularly, an output device may render information for external presentation. An input device may accept information from external sources. Non-limiting examples of interface devices include keyboards, mouse devices, trackballs, microphones, touch screens, printing devices, display screens, speakers, network interface cards, etc., including any mobile electronic device. According to some embodiments, the interface device allows the computer system 110 to exchange information and communicate with other components of the DCIM system and/or with external entities, such as the user 180. According to at least one embodiment, the interface device includes a user interface 155, as discussed further below.

The different components of the computer system 110 are each interconnected to the other components. For example, the processor is connected to both the system memory and the data storage element. Further, the computer system is in communication with other components of the DCIM system 100, such as the MOP optimizer 150 and the MOP library 105, through the communication network 115.

The computer system 110 discussed above is shown by way of example as one type of computer system upon which various aspects and functions may be practiced. Various aspects and functions may be practiced on one or more computers having architectures or components different from those discussed above. For instance, computer system 110 may include specially programmed, special-purpose hardware, such as for example, an application-specific integrated circuit ("ASIC") tailored to perform a particular operation disclosed herein. Another embodiment may perform the same function using a grid of several general-purpose computing devices running MAC OS System X with Motorola PowerPC processors and several specialized computing devices running proprietary hardware and operating systems.

The computer system 110 may further include an operating system that manages at least a portion of the hardware elements included in the computer system 110. In some examples, the processor executes an operating system. Examples of a particular operating system that may be executed include a Windows-based operating system, such as, Windows NT, Windows 2000 (Windows ME), Windows XP, Windows Vista, Windows 7, or Windows 8 operating systems, available from the Microsoft Corporation, a MAC OS System X operating system, or an iOS operating system available from Apple Computer, one of many Linux operating system available from Red Hat Inc., a Solaris operating system available from Sun Microsystems, or a UNIX operating system available from various sources. Many other operating systems may be used, and embodiments are not limited to any particular operating system.

The processor and operating system together define a computer platform from which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, Smalltalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various embodiments may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory, including volatile memory (such as RAM) or nonvolatile memory (such as a magnetic hard drive). In addition, the parameters may be logically stored in a proprietary data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

MOP Optimizer

The MOP optimizer 150 is configured to automatically generate an optimized MOP 152 using data gathered or received from one or more of the components of the DCIM system 100. According to some embodiments, the optimized MOP 152 may incorporate information obtained from the MOP library, the computer system 110, and the data center 101. For example, the optimized MOP 152 may be generated and maintained using one or more MOPs stored in the MOP library 105 and data obtained from a real-time model of the data center generated by the computer system 110, as discussed above. The optimized MOP 152 may include one or more partial and/or complete MOPs stored in the MOP library 105, where each of the partial MOP or complete MOP is comprised of one or more basic unit instructions, as discussed above. For instance, an MOP that has been recently updated may be incorporated into or otherwise comprise a part of another MOP that may have one or more sections that are outdated. In some instances, the recently updated MOP may be a partial MOP. Further, a section of an MOP (which may be a partial MOP) may be omitted, for example, if the relevant section is unnecessary due to current or historical data related to the targeted equipment. The MOP optimizer 150 may generate the optimized MOP 152 using any one or more of the components of the DCIM system 100, including input from a user 180 through the use of the user interface 155, and data from the data center, which may include real-time data associated with equipment in the data center.

The optimization capability of the MOP optimizer 150 may be manifested as software or computer code associated with a computer processor. According to some embodiments, the MOP optimizer 150 may be a stand-alone processing unit that is in communication with other components of the DCIM system 100 through the communication network 115. In other embodiments, the MOP optimizer 150 may be incorporated into one or more components of the computer system 110. For example, the MOP optimizer 150 may be stored as software on the data storage element and executed by the processor of the computer system 110.

One or more of the basic unit instructions are stored in the MOP library. As discussed previously, one or more of the basic unit instructions form a partial MOP or a complete MOP. One or more of the basic unit instructions may be organized such that the MOP optimizer 150 may be able to identify relevant basic unit instructions that form complete and/or partial MOPs. Thus, one or more of the basic unit instructions have at least one MOP identifier, also referred to herein as a procedure identifier. The MOP optimizer 150 may be able to search the MOP library using one or more keywords or other types of MOP identifiers. According to one embodiment, one or more basic unit instructions may be stored or otherwise organized as a set of flexible, self-referencing tables or look-up tables that may be tiered based on subsets of the data content. In other words, the data included in the MOPs may be partitioned so that each partition comprises a group of associated data files. Partitions can be of various types, and the partitions of the various MOPs may, at various times, be merged into a consolidated file within another partition. Each table may comprise a plurality of rows and columns, where each row and column includes an MOP identifier. A row may correspond to a particular data item, and a column may correspond to an attribute that is shared by all data items in the respective table. The intersection of a row and column may then correspond to a cell that contains data for a particular data item related to the particular shared attribute. In some instances, the cell may also point to another attribute. In some embodiments, the table may include an index structure for certain types of queries posed by the MOP optimizer. Based on the results of the query, a complete MOP may therefore be constructed. In some instances a plurality of basic unit instructions may be pieced together to create a complete MOP. Further, additional data, such as a model that incorporates real-time data obtained from equipment in the data center, may be used to create the MOP. For example, real-time data may be used to either identify one or more basic unit instructions or may be used as an identifier in assembling one or more basic unit instructions into a larger procedure. Thus, a data structure may associate one or more procedure identifiers with data values, such as real-time data obtained from the data center, or other data associated with the data center. One or more components of the DCIM system, such as the MOP optimizer, may be configured to select at least one procedure identifier from the data structure based on at least one data value. Further, a plurality of basic unit instructions may be identified within the data structure that are associated with the at least one procedure identifier.

The MOP may also be configured to resolve conflicts between two or more MOPs to determine which MOP should be used, for example, by discarding or archiving older, outdated procedures or parts of procedures. In other examples, when a change, such as equipment is phased or otherwise taken out, or new equipment is installed within the data center, the impacted MOPs are rebuilt or otherwise modified automatically. Further, if a partial procedure is updated, then the impacted MOPs may also be modified automatically. According to some examples, a user may be given the opportunity to review the modification before it is implemented into one or more MOPs.

As shown in FIG. 1, according to some embodiments the user interface 155 is configured to display the optimized MOP 152 that is generated by the MOP optimizer 150. This may allow the user interface 155 to interact with both the user 180 and the equipment 102. For example, the user interface 155 may obtain information from the user 180 and/or the equipment 102 and relay that information back to the MOP optimizer 150. According to one example, the user interface 155 may receive a query from the user 180 for a repair procedure for a component of a piece of equipment 102. The user interface 155 then sends the query to the MOP optimizer 150, receives the response from the MOP optimizer 150, and then displays the response for the user 180. According to another example, the MOP optimizer 150 may search the MOP library 105 for an MOP specific to the repair of the component, search the resources 103 for spare or replacement part(s) that may be necessary to complete the procedure, and query a real-time model of the data center generated, stored, and maintained on the computer system 110 to see if other equipment or conditions in the data center will affect the repair procedure. Based on this information, the MOP optimizer 150 generates a custom and optimized MOP 152 that reflects a repair procedure with all of the relevant information.

In accordance with at least one embodiment, if the MOP optimizer 150 is unable to generate a complete optimized MOP 152 due to an incomplete MOP library 105 or for some other reason, the MOP optimizer 150 may be configured to generate a message to the user. For example, depending on the number of individual steps and/or the complexity of one or more steps in a particular MOP, then the MOP optimizer 150 could generate a warning that states "some steps may be incomplete, please exercise caution," or simply report "error." For instance, a PM procedure that jumps between steps of identifying a down server and removing the server without performing intervening steps of performing a data back-up or disconnecting power may generate such a warning. In another example, the MOP optimizer 150 could report which steps are missing from the MOPs so that these may be added to the MOP library 105 for later use. The MOP optimizer 150 may use one or more conditions, as discussed below, in determining whether or not a step is missing. For instance, an individual step in a procedure may include one or more pre-conditions and one or more post-conditions. In some embodiments, the pre-conditions define the state that the system needs to be in for the individual step to be performed. The post-conditions define the state that the system is left in after the individual step is performed. For example, a step or series of steps may detail how to remove a side panel from a UPS. In order for the steps to be executed, the side panel must be present on the UPS. After the step(s) is executed, steps that require the side panel to be removed can be performed. Explained in a slightly different way, the MOP may be conceptually viewed as a sequence of steps that bring the data center from state A to state B. The difference between state A and state B may be small, large, or nonexistent, depending on the type of MOP and the content of the step(s). The MOP optimizer 150 therefore functions to select individual steps that result in the desired change of state (while still adhering to one or more conditions and/or data obtained from the data center). If the MOP optimizer 150 is unable to find such a sequence of steps, it may then inform the user of this information. Continuing the example from above, if a step that removes the side panel can't be found, and this step is necessary to reach state B, then the MOP optimizer 150 generates a warning.

According to at least one embodiment, the MOP optimizer 150 is configured to generate an optimized MOP 152 based on data obtained from a real-time model of the data center generated by the computer system 110. This information may allow the MOP optimizer 150 to select partial MOPs based on the configured hierarchy of devices and their relationship in the data center model. This includes generating complete MOPs or combining MOPs based on the knowledge of how devices are connected, their redundancy roles, their interdependencies, and the like. The MOP optimizer 150 is therefore configured to automatically generate an MOP based on the library of existing MOPs and a model of the data center describing relationships between equipment, such as power, cooling, networking, physical proximity, redundancy, etc. Further, the MOP optimizer 150 may have the ability to track and support MOPs currently in progress. This may be accomplished through the use of the real-time model provided by the computer system 110 or through other means, such as through the user 180. For example, the DCIM system 100 may receive input from a technician indicating that a specific MOP is in progress, such as by receiving a change in the status of the equipment from "online" to "offline" or by receiving data related to steps performed in the MOP, either from the user or from real-time data captured by the real-time model. Further, the MOP optimizer 150 may assist the technician as the procedure is executed. For example, the MOP optimizer 150 may provide audio and/or visual aids to instruct the technician through the various steps or acts of the procedure. Further, the equipment 102 that is undergoing the procedure may signal via LEDs or other communication means to the technician so that he or she performs the procedure on the correct device. The MOP optimizer 150 may also monitor the equipment that is being serviced, maintained, or repaired as well as any other device related or otherwise impacted by the targeted equipment to ensure that steps included in the MOP have been executed correctly and have the expected effects. For instance, sensors positioned in the equipment may be configured to measure one or more physical properties of the equipment, such as temperature, air flow, humidity, and electrical current. These physical properties may correspond to numerical values that can then be transmitted to other components of the DCIM system 100, such as the MOP optimizer 150. The transmitted values may then be compared against target, threshold, or other predetermined or otherwise expected values that correspond with a proper working order of the equipment or that convey one or more steps included in the procedure are being performed correctly.

In a further aspect, the MOP optimizer 150 may be configured to dynamically adapt the MOP if an unplanned event occurs during the course of the procedure or, as mentioned previously, the sensors detect or measure physical properties that are considered outside an expected range of values. The MOP optimizer 150 may then react by adapting the MOP to reflect a corrective course of action that addresses the identified problem. The optimized MOP 152 that is presented to the user 180 is therefore a flexible, dynamic procedure that can be targeted to a specific situation. In another embodiment, the MOP optimizer 150 may alert the technician to other MOPs that are in progress and that may impact the execution of the technician's own MOP. In certain instances, this may prevent the concurrent execution of MOPs that contradict each other, or prevent separate MOPs from being performed in combination when this combination prevents the operation of a required process or function. According to another example, if one technician updates an MOP to reflect a more efficient process, another technician may be prevented from executing the older, less efficient procedure. In specific instances, this may prevent maintenance procedures from being performed simultaneously on a primary and secondary power supply for equipment in a data center.

The optimized MOP 152 can be presented to the user 180 in a variety of different predetermined display formats on the user interface 155. For example, the user interface 155 can include a pop-up menu of screen settings that allow the user 180 to customize the display format, for example, the scale or dimension of the content included in the optimized MOP 152. According to some embodiments, the MOP optimizer 150 may first query the user 180 with one or more questions through the user interface 155 and then use that information to create an optimized MOP 152. In other embodiments, the user 180 queries the MOP optimizer 150 as to what activities need to be performed or may query for a procedure to be generated based on specific equipment. The MOP optimizer 150 may then create an optimized MOP 152 based, in part, on existing conditions in the data center 101. According to some embodiments, the MOP optimizer 150 presents the user 180 with a list of activities that the user 180 can choose from to perform. The list of activities may be presented in electronic form, for example, through an electronic device, such as a portable tablet or work station placed within the data center. The user 180 may also request an optimized MOP 152 to perform an activity related to the equipment as a whole or to a specific component of the equipment. Once selected, the user 180 can interact with the DCIM system 100, including the MOP optimizer 150, through the user interface 155 on the progress of the selected activity (i.e., optimized MOP 152).

User Interface

A technician may be able to communicate with one or more components of the DCIM system 100 through the use of a user interface 155. The user interface 155 may function in a similar manner as the interface device described above in reference to the compute system 110. For example, the user interface 155 may receive input or provide output. In certain instances, the user interface 155 may render information for external presentation and may accept information from external sources. Non-limiting examples of user interface devices include keyboards, mouse devices, trackballs, microphones, touch screens, printing devices, display screens, including graphical user interfaces (GUIs), speakers, mobile electronic devices, etc. The user interface device 155 may allow an external entity, such as a user 180, to exchange information and communicate with one or more other components of the DCIM system 100, such as the MOP library 105, the computer system 110, and the MOP optimizer 150 through the communication network 115.

In some embodiments, the user interface 155 communicates information to the user 180 and requests user input by way of an interactive, menu-driven, visual display-based interface. For example, the user interface 155 can include several buttons or keys with which the user 180 may interactively input information or select menu items. A display screen is also included with the user interface 155, such as a liquid crystal display (LCD). The optimized MOP 152 may be displayed on the user interface 155.

According to some embodiments, the user interface 155 is a stand-alone device, meaning it is not incorporated into other components of the DCIM system 100. For example, the user interface 155 may be part of a mobile electronic device, laptop, or other form of computing device or computing station that is accessible to the user 180 and is in communication with other components of the DCIM system 100 through the communication network 115. In other embodiments, the user interface 155 is incorporated into one or more of the other components of the DCIM system. For example, the user interface 155 may be incorporated into the computer system 110 as the interface device. In another example, the user interface 155 is incorporated into the equipment 102. For example, the user interface 155 may be a GUI or other display device that forms one or more components of the equipment 102.

According to some embodiments, the MOP optimizer 150, the computer system 110, the MOP library 105, and the user interface 155 may be integral hardware devices included in the DCIM system 100. For example, the disclosed systems and methods can be implemented using hardware, for example in the form of an integrated circuit. Additionally, one or more of the components, such as the MOP optimizer 150, may be implemented as software loaded into the system memory or the data storage element of the computer system 110. The disclosed systems and methods can be implemented using software executed on any suitable processor, such as a server, a personal computer (PC), a Personal Digital Assistant (PDA), a collection of networked servers or personal computers, a mainframe computer, or the like.

Resources

According to some embodiments, a resource component 103, also referred to as "resources," may also be included in the DCIM system 100. As discussed previously, resources 103 may include mechanical support for the data center equipment 102, such as utility power. According to another example, resources 103 may include one or more parts, such as spare parts, or consumable items that form components or subcomponents of the equipment included in the data center. Resources 103 may therefore include items related to maintenance procedures, including miscellaneous hardware such as nuts, bolts, couplings, cables, wiring, piping, tubing, and the like, as well as other components such as racks, fans, electronic components, etc. Resources 103 may also refer to kits that are designated for certain tasks, such as periodic PMs and replacement kits for specific components. For example, a fan replacement kit may include the required spare parts, and in some instances, the tools required to perform the fan replacement procedure. Resources may also include equipment, such as servers, heating, power, and cooling devices. According to some embodiments, the resource component 103 may function as an inventory manager. When new parts, components, or equipment are brought to the facility, they may be "checked in" to the resource component 103. Likewise, when these items are removed and brought into use in the data center 101, they may be "checked out." In certain embodiments, a list may be generated of resources, such as kits or parts required for maintenance procedures, that are need to be acquired to perform upcoming scheduled MOPs. These lists may therefore form a basis for ordering these required materials.

According to a further embodiment, resources 103 may also include personnel. For example, a procedure may require a certain level of technician who is qualified to perform the specified tasks. Individual technicians may "clock in" or otherwise be accounted for by the resource component 103. If a technician with the required level of skills is not available, then the MOP optimizer 150 may generate alternative MOPs based on the skill level of the available personnel. Likewise, if a technician with the required skill level is available, then an MOP may be generated based on this information. As will be recognized by those skilled in the art, the resource component 103 may include any of numerous other types of resources that may be used to support the functionality of the data center and its contents.

According to some embodiments, the resource component 103 may function as a database or other electronic storage device that is in communication with one or more components of the DCIM system 100, including the MOP optimizer 150 and the computer system 110. In some embodiments, the resource component 103 is a stand-alone device, whereas in other embodiments, it may be stored in the system memory of the computer system 110. The resource component 103 may also be in communication with the data center 101 through the communication network 115.

Figure 2:
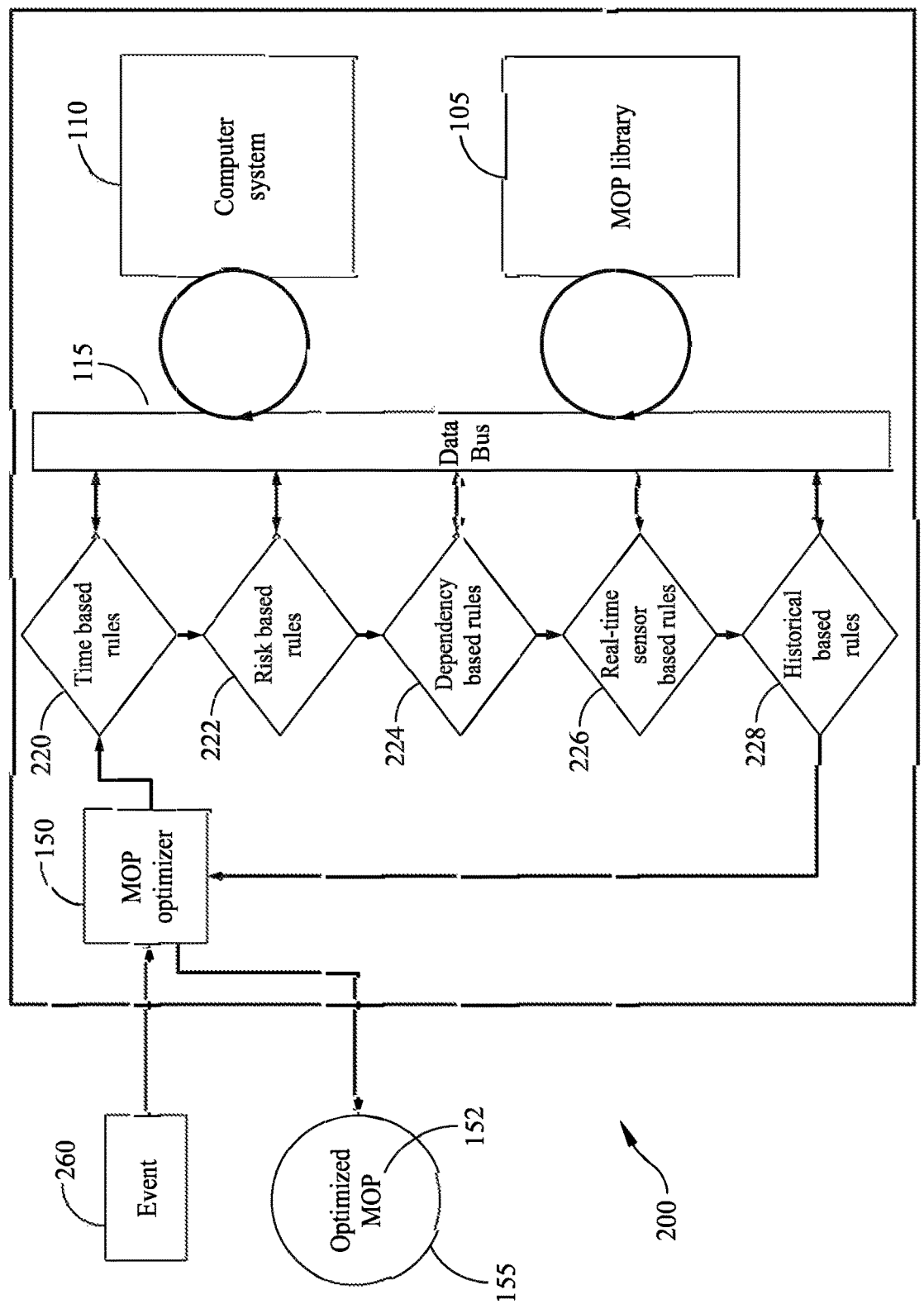
FIG. 2 is a navigational context diagram of a DCIM system according to another example.

A second representative DCIM system, generally indicated at 200, is illustrated in FIG. 2. The DCIM system 200 includes a computer system 110, an MOP library 105, a communication network 115, and a user interface 155 for displaying an optimized MOP 152, each of which is provided as discussed and described above. The DCIM system 200 further includes a set of conditions related to the data center 220, 222, 224, 226, and 228, each of which includes at least one rule, as discussed further below that may be used by the MOP optimizer 150 in creating the optimized MOP 152.

According to at least one embodiment, the MOP optimizer 150 automatically and systematically generates an optimized MOP 152 based on identifying a rule for the one or more conditions, and then determining that the rule is satisfied. According to a further embodiment, the rule(s) may be established and stored by a user and/or another component of the DCIM system. As recognized by those skilled in the art, conditions 220, 222, 224, 226, and 228 are not exhaustive.

Time based conditions 220 may include the lapse of a specific or approximate amount of time, such as the amount of time to perform a scheduled maintenance procedure, or the amount of time in between scheduled maintenance procedures. Time based conditions 220 may also include scheduling information, such as the occurrence of one or more periodic maintenance procedures. Time based conditions 220 may also refer to future planned work that can be analyzed to accommodate its impact on the future workload of the data center.

Risk based conditions 222 may refer to instances where different tasks conflict with one another and therefore priority has to be placed on one task over the other. For example, two separate pieces of equipment may need to be serviced, but based on time, personnel, or other constraints, only one piece of equipment may be serviced. The pros and cons of removing each piece of equipment from operation are balanced against one another, and one piece of equipment is then chosen. For example, one piece of equipment may be selected to receive service based on the fact that it is necessary for carrying a vital processing load. For instance, during the Christmas shopping season, a particular server may be used to support an online shopping website. Compared to a slower summer month, losing uptime for this server during the Christmas shopping season is a greater risk. In another example, the equipment may be selected based on the fact that it hasn't been serviced for a longer period of time than other pieces of equipment, or is overdue for a periodic PM. Risk may be associated with the probability or likelihood that the equipment will fail and may be linked to a statistic such as the equipment's historical or known mean time between failures (MBTF). For example, as equipment gets older, it becomes more likely to fail, and it may be necessary to perform preventative maintenance more often in order to maintain the equipment in proper working order. According to another example, in an effort to maintain maximum uptime, the data center is designed to include several redundant configurations for power, cooling, etc. Therefore, it could be deemed to be too risky, for example, to perform a firmware update on all cooling units simultaneously. The risk based conditions 222 are meant to capture any one or more of these types of scenarios, so that the data center is not put overly at risk.

Conditions based on dependency 224 may relate to the availability of resources on site, including materials and spare parts, and could also include the level of expertise of certain resources related to personnel, such as service technicians. Dependency may take the form of a physical dependency, such as how equipment is connected. For instance, dependency could include back-up power or UPS devices that are linked to the server equipment and provide power, for example, during blackout or brownout conditions. Further, dependency may also relate to dependencies between procedures, including sequencing of procedures, such as one procedure that cannot be performed until the completion of another procedure.

Real-time sensor value based conditions 226 refer to real-time data obtained from one or more sensors positioned in the data center. As discussed above, the real-time sensor data may include information regarding one or more current physical properties of equipment or conditions within the data center. Real-time sensor value based conditions 226 may also refer to data that is not obtained using a sensor that measures physical properties. For example, equipment may be placed on stand-by status by a technician or other user. Real-time sensor value based conditions 226 may refer to specific alarms from one or more devices in the data center and the general state of one or more devices.

Historical based conditions 228 may refer to one or more physical properties of equipment or conditions within the data center that were obtained in the past using a sensor. Historical based conditions 228 may also refer to data that is not obtained by a sensor. For example, the maintenance records of equipment may be included in the historical based conditions 228. Further, historical based conditions 228 may include records of MOPs performed on each piece of equipment.

Other conditions include conditions related to changes or rates of changes of single or multiple measured or computed values. For example, a sudden drop of power may be flagged by the MOP optimizer 150, which may then construct an MOP targeted to troubleshooting the problem to find the underlying cause. Depending on the specific application, these types of conditions may fall into one or more of the other previously discussed conditions, such as real-time sensor value based conditions and/or historical based conditions 228. For example, a real-time sensor value based condition may include comparing the real-time value to one or more historical values.

As shown in FIG. 2, an event 260 may trigger the MOP optimizer 150 to query or otherwise analyze one or more of the conditions 220, 222, 224, 226, and 228 to construct an optimized MOP 152. The event 260 may correspond to at least one data value associated with the data center. For example, a technician or a certain skill level may log into the system, or equipment within the data center may malfunction. Further, conditions 220, 222, 224, 226, and 228 may be constructed, established, and/or stored by using data provided by computer system 110 and the MOP library 105 through the communication network 115. For example, real-time data taken by sensors in the data center may be obtained by the computer system 110 and then sent through the communication network 115 to be factored or otherwise included into the real-time sensor value based conditions 226. In a similar manner, historical maintenance data obtained by the computer system 110 may be included into the historical based conditions 228.

The MOP optimizer 150 may then use one or more of the conditions discussed above to create an optimized MOP 152. The MOP optimizer 150 is also configured to generate an optimized MOP 152 based on "just in time" principles. This may be accomplished by generating procedures that accommodate one or more events in the data center, such as changes in the state of a piece of equipment, and/or an amount time that has elapsed. The DCIM system 200 is also configured to log monitored data, such as sensor data, as well as data captured during the execution of the MOP.

The triggering event 260, as discussed above, may be associated with at least one data value associated with the data center. For example, the triggering event 260 may be caused by a user, such as a technician, who queries the MOP optimizer 150 for a list or schedule of activities, including their procedures, to execute during his or her designated shift. The triggering event 260 may also be caused by a piece of equipment related to the data center. For example, equipment may overheat or lose power, which may cause the MOP optimizer 150 to create an optimized MOP 152 based on troubleshooting the underlying cause and then repairing the equipment. The optimized MOP 152 can be generated using a combination of one or more of the previously discussed conditions and one or more basic unit instructions obtained from the MOP library 105. Other non-limiting examples of a triggering event 260 may include power loss, communication network connectivity loss, changes in server loads, changes in sensor measurements, such as temperature values suddenly increasing or decreasing, and other similar types of events.

According to one example, the event 260 is triggered by a technician who "clocks in" at the beginning of his or her shift and desires to change five different fan filters. Real-time data obtained from the data center may indicate that operations are normal so that equipment redundancy requirements are met. Further, real-time data captured by sensors in the data center may also indicate that the temperature of the air within the data center is low enough so that powering one fan down at a time and taking it out of service will not increase the temperature of the air in the vicinity of potentially impacted equipment to an unacceptable level. Further, resource data indicates that there are enough available spare filters to perform each of the change procedures. All of this condition-based data is sent to the MOP optimizer 150, which then generates the optimized MOP 152. The MOP optimizer 150 may also provide a designated priority or order in which to service each of the five fan filters.

The DCIM systems discussed above are configured to possess several capabilities. For example, the systems are capable of predicting and planning future workload using MOPs that are to be executed based on a combination of factors, including scheduling, such as technician scheduling and/or processing load of the data center, and based on an understanding of the state of the data center through a real-time model. Further, information may be presented to a user, such as a technician, on any user interface, including a mobile electronic device, such as a laptop or other computer, and/or a wearable device such as a watch or a pair of glasses. During the performance of an MOP, the DCIM system receives real-time data associated with the MOP and can ascertain whether the individual steps within the MOP are being performed in the correct order and/or are being performed correctly. If not, the user may be updated and the MOP may be modified and updated to compensate for the error(s).

The DCIM systems are also capable of analyzing the amount of time spent performing MOPs and calculating the associated costs, such as the cost of spare parts and costs associated with the technician. Further, the systems can analyze errors and sensor data at time periods before, during, and after MOPS to determine statistical information, such as trends and outliers. All of this information may be used to optimize the content of the MOPs and to optimize the scheduling of their execution.

Figure 3:
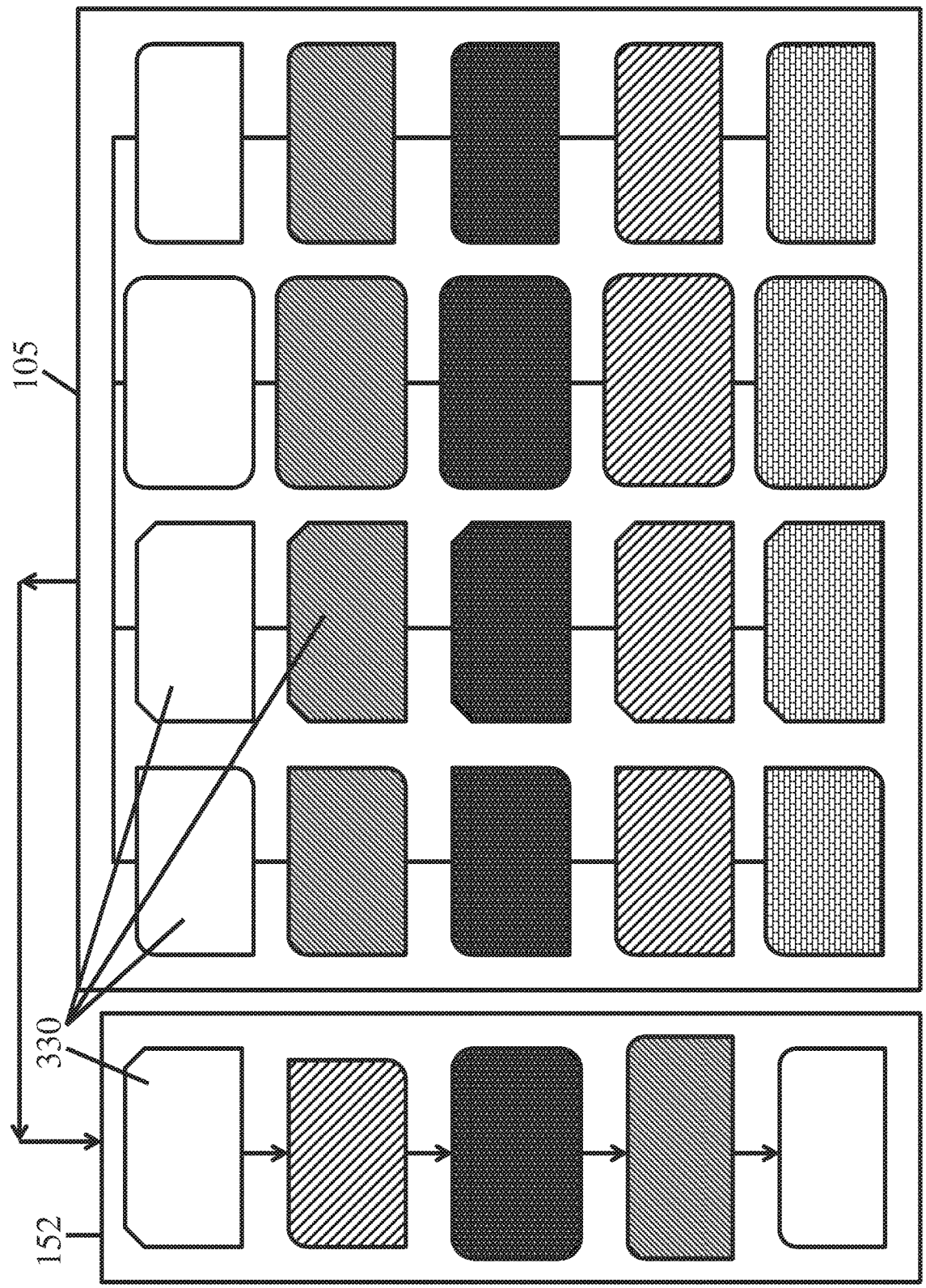
FIG. 3 is a navigational context diagram of subcomponents of a DCIM system according to yet another example.

An example MOP library 105 and optimized MOP 152 as components of a DCIM system are illustrated in FIG. 3. As shown, the MOP library 105 includes MOP components 330 that form the basic unit instructions of an optimized MOP 152. For example, each MOP component 330 may be a partial procedure, such as a set of instructions on how to disconnect power to a particular type of equipment or replace a part in a cooling device. As discussed above, the MOP components 330 may be arranged within the MOP library 105 by groups, such as by procedures that achieve a common goal and/or a common initial condition. For example, FIG. 3 illustrates four vertical rows and five vertical columns of MOP components 330. In this particular example, each column represents a group of MOP components 330 that share a common task or goal, such as disconnecting power. Each row represents a particular component of a piece of equipment. The optimized MOP 152 is constructed by combining each MOP component 330 into a complete procedure. For example, the first MOP component 330 in the optimized MOP 152 may include instructions on how to power down a power supply located within the data center and the last MOP component 330 may include instructions on how to power up the same power supply. The intervening MOP subcomponents 330 include a series of instructions that relate to a PM procedure and/or instructions for replacing a component of the power supply.

Example 1—Technician Performs an MOP

Figure 4:
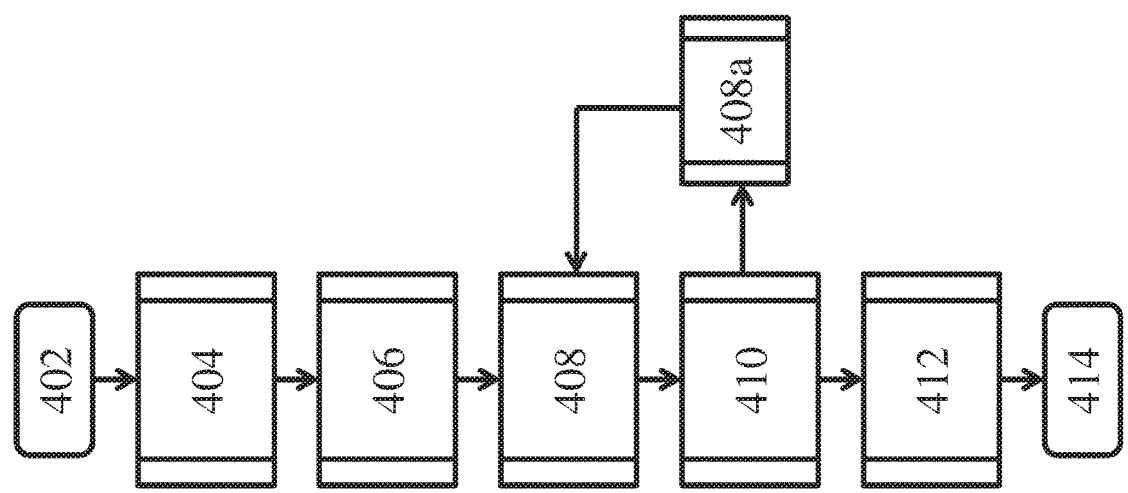
FIG. 4 is a flow chart of an example process of a technician performing an MOP according to yet another example.

Various examples provide processes for performing an MOP in a data center. FIG. 4 illustrates one such process 400 that includes acts performed by a technician and the DCIM system while performing an MOP. The process begins at act 402 by the technician logging into the DCIM system through a user interface, such as a mobile electronic device. According to this example, at act 404 the DCIM system alerts the technician through the user interface that a specific MOP is due to be executed on a piece of designated equipment. The DCIM system then directs the technician to the equipment at act 406, such as through the use of flashing LEDs or by using a display located on the equipment. At act 408 an optimized MOP displayed on the user interface directs the technician through the procedure by providing act-by-act instructions. At act 410, the DCIM system tracks the technician's progress through the procedure and ensures that all the acts are performed correctly by cross-referencing measured values against expected values obtained from the equipment and any related equipment. If the DCIM system detects an anomaly, such as an unexpected failure, or determines that a measurement obtained by a sensor is recording a value outside an expected range of values, the system will immediately notify the technician and present him or her with an updated MOP at 408*a* that accounts for the new conditions. During the course of the procedure, the DCIM system also logs all of the work performed by the technician, including associated changes to the data center, for later analysis, which is indicated at act 412. The process ends at act 414, when the MOP has been either successfully completed or has been otherwise terminated by the DCIM system. The MOP may be terminated by the DCIM system if an emergency occurs or if a catastrophic failure will occur if the MOP continues to be performed. This may occur, for example, in the event that the technician fails to follow the corrective measures included in an updated MOP.

Example 2—Update MOP Resulting from Planned Change

According to a second example, a technician performs a planned installation of a new rack of high density server equipment. When the technician has completed the installation, the DCIM system registers this information and automatically generates MOPs for servicing and maintaining the newly installed equipment. The newly installed rack of servers may impact activity within the data center by increasing the IT load, and subsequently increase the amount of heat dissipation that occurs within a specific location of the data center. This causes changes in the airflow and cooling redundancy of the data center. The system is therefore configured to incorporate these changed conditions by providing updates to one or more associated MOPs. These updates may include new combination(s) of cooling units that may not undergo maintenance at the same times. The updates may also include changes related to the potential impact on other equipment in the data center when maintenance is performed on the new equipment.

Although the embodiments and examples discussed above are directed to a data center application, it will be appreciated that the disclosed methods and systems are also applicable to other environments, including process manufacturing facilities, municipal facilities, transportation facilities, and the like.

Further, aspects of this disclosure provide one or more advantages over other MOP management systems that use manual processes for indexing and categorizing procedures, which results in isolated, inflexible and non-dynamic procedures. For example, the disclosed DCIM systems are configured to automatically maintain, create, verify, and update MOPs based on real-time conditions in the data center. The systems and methods are also capable of creating flexible, dynamic schedules for the immediate execution of MOPs based on events and/or time conditions. Human resources, such as technicians and their respective skill level, may also be taken into consideration when scheduling the execution of a particular MOP. MOPs may be created using "just in time" principles that accommodate unpredicted events or a combination of events. Further, the disclosed systems are configured to keep track of spare parts or other related resources and are able to factor in their availability when creating an MOP. MOPs that are currently in progress can be tracked and supported automatically and their impact on the data center can be analyzed to alleviate or otherwise reduce potential failures. The DCIM systems may also re-distribute workload within the data center to control and minimize the impact of an MOP on the functionality of the data center. For example, the flow and usage of power and cooling within the data center can be adjusted to different equipment. Further, additional cooling units or fan speeds in other cooling units can be increased when one cooling unit is being serviced to ensure that servers or other equipment do not overheat during the course of the procedure. In addition, the processing load to potentially impacted equipment during the execution of an MOP may be migrated to other unaffected equipment.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer-implemented system for providing at least one data center procedure to a user, comprising:
 a communication network;
 a storage device configured to store a plurality of basic unit instructions;
 at least one processor coupled to the storage device and the communication network;
 a user interface configured to be accessed by a user; and
 one or more components executable by the at least one processor and collectively configured to:
  alert the user through the user interface that a specific method of procedure is due to be executed on a piece of designated equipment;
  direct the user to the piece of designated equipment;
  display an optimized method of procedure on the user interface to guide the user through a procedure by providing act-by-act instructions;
  track progress of the user through the procedure;
  detect a measurement obtained by a sensor associated with the piece of designated equipment is recording a value outside an expected range of values; and
  notify the user and presenting the user an updated method of procedure that addresses the value outside the expected range of values,
 wherein directing the user to the piece of designated equipment includes use of flashing LEDs associated with the piece of designated equipment or by use of a display located on the piece of designated equipment.

2. A computer-implemented system for providing at least one data center procedure to a user, comprising:
 a communication network;
 a storage device configured to store a plurality of basic unit instructions;
 at least one processor coupled to the storage device and the communication network;
 a user interface configured to be accessed by a user; and
 one or more components executable by the at least one processor and collectively configured to:

alert the user through the user interface that a specific method of procedure is due to be executed on a piece of designated equipment;

direct the user to the piece of designated equipment;

display an optimized method of procedure on the user interface to guide the user through a procedure by providing act-by-act instructions;

track progress of the user through the procedure;

detect a measurement obtained by a sensor associated with the piece of designated equipment is recording a value outside an expected range of values; and notify the user and presenting the user an updated method of procedure that addresses the value outside the expected range of values, wherein tracking progress of the user through the procedure includes ensuring that all the acts are performed correctly by cross-referencing measured values against expected values obtained from the piece of designated equipment.

3. A computer-implemented system for providing at least one data center procedure to a user, comprising:

a communication network;

a storage device configured to store a plurality of basic unit instructions;

at least one processor coupled to the storage device and the communication network;

a user interface configured to be accessed by a user; and one or more components executable by the at least one processor and collectively configured to:

alert the user through the user interface that a specific method of procedure is due to be executed on a piece of designated equipment;

direct the user to the piece of designated equipment;

display an optimized method of procedure on the user interface to guide the user through a procedure by providing act-by-act instructions;

track progress of the user through the procedure;

detect a measurement obtained by a sensor associated with the piece of designated equipment is recording a value outside an expected range of values; and notify the user and presenting the user an updated method of procedure that addresses the value outside the expected range of values, wherein the at least one processor further is configured to log the progress of the user through the procedure.

4. A computer-implemented system for providing at least one data center procedure to a user, comprising:

a communication network;

a storage device configured to store a plurality of basic unit instructions;

at least one processor coupled to the storage device and the communication network;

a user interface configured to be accessed by a user; and one or more components executable by the at least one processor and collectively configured to:

alert the user through the user interface that a specific method of procedure is due to be executed on a piece of designated equipment;

direct the user to the piece of designated equipment;

display an optimized method of procedure on the user interface to guide the user through a procedure by providing act-by-act instructions;

track progress of the user through the procedure;

detect a measurement obtained by a sensor associated with the piece of designated equipment is recording a value outside an expected range of values; and notify the user and presenting the user an updated method of procedure that addresses the value outside the expected range of values, wherein the at least one processor further is configured to terminate the method of procedure in the event of an emergency occurs or a catastrophic failure of the piece of designated equipment.

* * * * *